United States Patent [19]
Giebel et al.

[11] Patent Number: 5,926,303
[45] Date of Patent: Jul. 20, 1999

[54] SYSTEM AND APPARATUS FOR OPTICAL FIBER INTERFACE

[75] Inventors: Louis J. Giebel, Whitesboro; Matthew L. Heston, Dallas, both of Tex.

[73] Assignee: Alcatel USA Sourcing, L.P., Plano, Tex.

[21] Appl. No.: 08/901,996

[22] Filed: Jul. 29, 1997

[51] Int. Cl.$^6$ ..................................................... H04B 10/00
[52] U.S. Cl. ........................ 359/163; 359/115; 359/152; 359/110; 370/535
[58] Field of Search ................................. 359/163, 152, 359/115, 158, 110, 173; 370/535, 907

[56] References Cited

U.S. PATENT DOCUMENTS 5,568,300  10/1996  Ishibashi ................................. 359/163
5,781,320   7/1998  Byers ..................................... 359/163

*Primary Examiner*—Kinfe-Michael Negash
*Attorney, Agent, or Firm*—Baker & Botts, L.L.P.

[57] ABSTRACT

An optical interface circuit [40] is provided. The optical interface circuit [40] includes a receiver circuit [82, 102] that receives incoming data from an optical signal and generates an electrical signal having the encoded data. The optical interface circuit [40] also includes a transmitter circuit [82, 104] that receives outgoing data and encodes the outgoing data into an optical signal. An interface circuit [112] connected to the receiver circuit [82, 102] and the transmitter circuit [82, 104] transmits control commands and control data to the receiver circuit [82, 102] and the transmitter circuit [82, 104], and receives response data from the receiver circuit [82, 102] and the transmitter circuit [82, 104]. A controller circuit [84, 114] connected to the interface circuit [112] transmits the control commands and the control data to the interface circuit [112] and receives the response data from the interface circuit [112].

26 Claims, 3 Drawing Sheets

5,926,303

SYSTEM AND APPARATUS FOR OPTICAL FIBER INTERFACE

TECHNICAL FIELD OF THE INVENTION

The present invention relates in general to telecommunications data switching and more particularly to a system and apparatus for interfacing an electrical data system with a fiber optic media for use with telecommunications equipment.

BACKGROUND OF THE INVENTION

Modern telecommunications systems typically utilize digitally encoded data instead of analog data. If analog data is used, it may be converted to digital data for the purposes of switching the data between conducting media. Switching of data occurs at large telecommunications switches, which may receive and process hundreds or thousands of data channels.

One method of carrying a large number of data channels comprises encoding the data into an optical signal. A single optical fiber has greater usable bandwidth, occupies less physical space, and may have a lower cost than most electrical conductors. Nevertheless, the data encoded into the optical signal carried by an optical fiber must be converted into data encoded into an electrical signal before the data can be processed for use in telecommunications applications.

Because the data transmitted over an optical fiber is received and transmitted at high speeds, it is necessary to precisely control the reception and transmission of data at the interface between the optical and electrical systems. If the reception and transmission of data at the interface between the optical and electrical systems is not precisely controlled, then errors may be introduced into the data that can cause loss of data, interruption of data channels, and failure of the data transmission system.

SUMMARY OF THE INVENTION

Therefore, a need has arisen for a system and apparatus for an optical fiber interface that allows the reception and transmission of data at an optical to electrical interface to be precisely controlled.

In accordance with the present invention, a system and apparatus for an optical fiber interface is provided that substantially eliminates or reduces disadvantages and problems associated with previously developed optical fiber interfaces.

One aspect of the present invention is an optical interface circuit that includes a receiver circuit that receives incoming data from an optical signal and generates an electrical signal having the encoded data. The optical interface circuit also includes a transmitter circuit that receives outgoing data and encodes the outgoing data into an optical signal. An interface circuit connected to the receiver circuit and the transmitter circuit transmits control commands and control data to the receiver circuit and the transmitter circuit, and receives response data from the receiver circuit and the transmitter circuit. A controller circuit connected to the interface circuit transmits the control commands and the control data to the interface circuit and receives the response data from the interface circuit.

One important technical advantage of the present invention is an optical fiber interface that is operable to simultaneously transfer data channels between an optical signal and an electrical signal while extracting data from the data channels. The optical fiber interface improves the reliability and accuracy of data channel transfer by monitoring the extracted data with a local controller.

Another important technical advantage of the present invention is an optical fiber interface that is operable to simultaneously transfer data channels between an optical signal and an electrical signal while inserting data into the data channels. The optical fiber interface improves the reliability and accuracy of data channel transfer by monitoring the response of the optical fiber interface components to determine their operational status.

BRIEF DESCRIPTION OF THE DRAWINGS

For a more complete understanding of the present invention and the advantages thereof, reference is now made to the following description taken in conjunction with the accompanying drawings, wherein like reference numerals represent like parts, in which.

DETAILED DESCRIPTION OF THE INVENTION

Preferred embodiments of the present invention are illustrated in the figures, like numbers being used to refer to like and corresponding parts of the various drawings.

Figure 1:
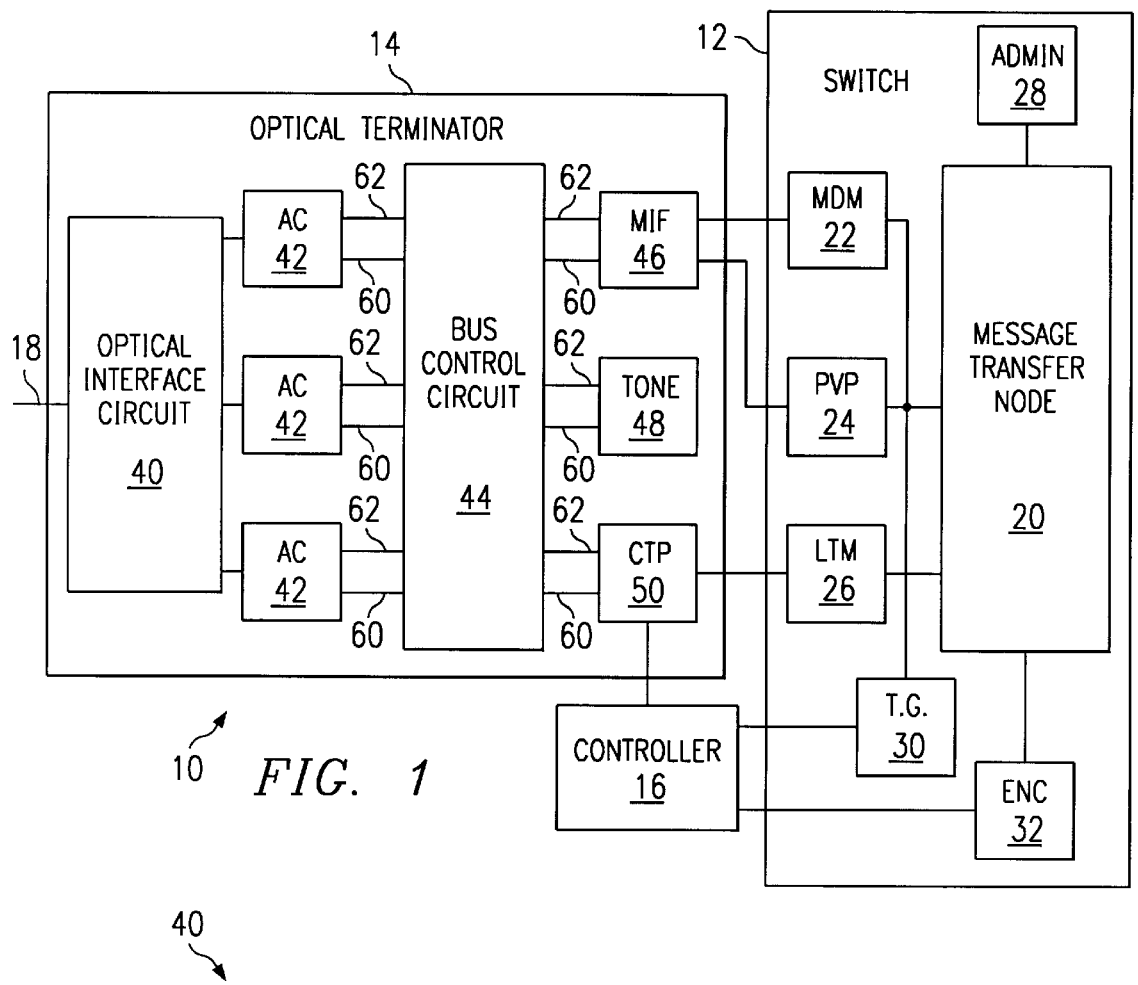
FIG. 1 illustrates a fiber optic termination module for a telecommunications switch embodying concepts of the present invention.

FIG. 1 is a system diagram of optical fiber-capable telecommunications switch system 10. Optical fiber-capable telecommunications switch system 10 includes switch 12 connected to fiber optic connection unit 14 and common controller 16. Optical telecommunications data channels, such as a stream of bit-serial data, byte-serial data, or serial frames of data, are received over one or more optical fibers 18 at fiber optic connection unit 14. These telecommunications data channels are converted to electrical signals by fiber optic connection unit 14 and are transmitted to switch 12 for switching between data channels. Switch 12 may switch data channels of any suitable size, such as DS0, DS1, DS3, or other suitable channels. Common controller 16 receives control data from and transmits control data to fiber optic connection unit 14 and switch 12.

Switch 12 is a telecommunications switch having M input channels and N output channels, where M and N are integers. Switch 12 receives telecommunications data at any of the M input channels and to transfer the telecommunications data to any of the N output channels. Switch 12, as shown in FIG. 1, is a digital switch, but may also be an analog switch. Switch 12 may include, for example, a Megahub 600E Digital Telecommunications Switch manufactured by DSC Communications Corporation of Plano, Tex. Switch 12 includes a message transport node 20 coupled to a matrix data multiplexer circuit (MDM) 22, a matrix control path verification processor (PVP) 24, a line trunk manager circuit (LTM) 26, administration circuit (ADMIN) 28, timing generator circuit (TG) 30, and Ethernet network circuit (ENC) 32.

Matrix data multiplexer circuit 22 is further coupled to matrix control path verification processor 24 and timing generator circuit 30. Matrix data multiplexer circuit 22 is an interface circuit that may be used for coupling data channels between fiber optic connection unit 14 and the switching matrix (not explicitly shown) of switch 12. In particular, matrix data multiplexer circuit 22 provides the interface for DS0 data. Matrix data multiplexer circuit 22 receives 2048 channels of DS0 data from fiber optic connection unit 14 on a 10-bit parallel data channel operating at a frequency of 16.384 MHZ. These DS0 data channels are then transmitted to the M input ports of the switching matrix of switch 12.

Control commands received at switch 12 from common controller 16 are used to determine the proper connections between the M input ports and the N output ports of the switching matrix. The DS0 data channels are transmitted through the switching matrix after the connections have been formed. The DS0 data channels received at matrix data multiplexer circuit 22 from the N output ports of the switching matrix are then transmitted back to fiber optic connection unit 14.

Matrix control path verification processor 24 is coupled to fiber optic connection unit 14 and to message transport node 20. Matrix control path verification processor 24 is a switching matrix administration and control component that processes matrix channel low level fault detection and fault isolation data.

Line trunk manager circuit 26 is coupled to fiber optic connection unit 14 and message transport node 20. Line trunk manager circuit 26 is a switching matrix control component that receives and transmits data relating to call processing functions for fiber optic connection unit 14.

Timing generator circuit 30 is coupled to matrix data multiplexer circuit 22 and common controller 16. Timing generator circuit 30 is a switch timing circuit that receives timing data from an external source, such as fiber optic connection unit 14, and transmits the timing data to components of switch 12.

Ethernet network circuit 32 is coupled to message transport node 20 and common controller 16. Ethernet network circuit 32 is a data communications interface, and transfers data between message transport node 20 and common controller 16.

Fiber optic connection unit 14 includes an optical interface circuit 40, application circuits (AC) 42, a bus control circuit 44, a matrix interface circuit (MIF) 46, a tone recognition circuit (TONE) 48, and a high speed line trunk processor circuit (LTP) 50. Fiber optic connection unit 14 receives digitally encoded optical data from optical fiber 18, performs broadcast switching of the data channels received from optical fiber 18, transmits synchronous transfer mode (STM) telecommunication data to matrix data multiplexer circuit 22 and matrix control path verification processor 24 for switching through the switching matrix of switch 12, and receives the switched telecommunications data from switch 12 for transmission over optical fiber 18.

Optical interface circuit 40 is capable of terminating optical signals, for example OC-3, connected to the public switched network (PSN). Optical interface circuit 40 receives digitally encoded optical telecommunications data from optical fiber 18 and converts the optical signals into electrical signals, for example STS-1, for transmission to other components of fiber optic connection unit 14. Optical interface circuit 40 is coupled to optical fiber 18 and to application circuits 42. Optical interface circuit 40 may include a single circuit card with electronic circuit subcomponents (not explicitly shown) that have plug-in connectors to allow the card to be easily installed in a cabinet containing other component circuit cards of fiber optic connection unit 14. Alternatively, optical interface circuit 40 may include two or more circuit cards, or one or more discrete components on a circuit card.

Application circuits 42 are telecommunications data transmission system components which are coupled to bus control circuit 44. Each application circuit 42 may have a separate circuit card (not explicitly shown) with plug-in connectors in order to be easily installed in a rack containing fiber optic connection unit 14. Alternatively, application circuits 42 may include multiple circuit cards, or individual components on a single circuit card.

As shown in FIG. 1, application circuits 42 are configured to receive data from and transmit data to optical interface circuit 40. This data may comprise synchronous transfer mode telecommunications data. For example, application circuits 42 may receive a single STS-3 channel of data that includes a plurality of DS0 data channels, where each DS0 data channel is a continuous stream of data equal to 65,536 bits per second. This data would be received in a predetermined format that may include administration data, control data, routing data, and payload data. The administration data, control data, and routing data is used to separate the individual DS0 data channels within the STS-3 data channel, and the payload data comprises the actual data carried in each individual DS0 data channel.

Application circuits 42 may also receive asynchronous transfer mode (ATM) telecommunications data. Asynchronous transfer mode data may be transmitted as a single channel of fixed bit format data frames that comprise additional channels of data. The number of data frames transmitted per second for a given data channel may be varied for asynchronous transfer mode data in order to accommodate fluctuations in the amount of data per channel and the number of data channels transferred.

Bus control circuit 44 may be coupled to a number of other application circuits with more specific functions, such as matrix interface circuit 46, tone recognition circuit 48, and high speed line trunk processor circuit 50. Nevertheless, the common characteristic of application circuits 42 is that they are operable to transmit data to bus control circuit 44 over ingress buses 60 and to receive data from bus control circuit 44 over egress buses 62.

Bus control circuit 44 receives telecommunications data from applications circuits 42 over ingress buses 60, multiplexes the data into a single broadcast data channel, and transmits the broadcast data channel over egress buses 62. In this manner, bus control circuit 44 also operates as a broadcast switching device. Each application circuit 42 receives the broadcast data channel containing data from other application circuits, and can then process the data or transfer the data back to optical interface circuit 40 for transmission on optical fiber 18 to the network. Bus control circuit 44 may be a separate circuit card with plug-in connectors in order to be easily used in a rack containing fiber optic connection unit 14. Alternatively, bus control circuit 44 may include multiple circuit cards, or individual components on a single circuit card.

Matrix interface circuit 46 provides the protocol and transport format conversion between fiber optic interface circuit 14 and switch 12. Matrix interface circuit 46 is an application circuit that is used to transmit data received from the broadcast data channel transmitted by bus control circuit 44 to switch 12. Matrix interface circuit 46 is coupled to bus control circuit 44, matrix data multiplexer circuit 22, and matrix control path verification processor 24. Matrix interface circuit 46 converts the data format of the broadcast data channel received from bus control circuit 44 and switch 12 into a data format that is compatible with switch 12 and bus control circuit 44, respectively. Matrix interface circuit 46 may be a separate circuit card with plug-in connectors in order to be easily used in a rack containing fiber optic connection unit 14. Alternatively, matrix interface circuit 46 may include multiple circuit cards, or individual components on a single circuit card.

Tone recognition circuit 48 is an application circuit that is coupled to bus control circuit 44 and performs tone recognition functions for fiber optic connection unit 14. One pair of tone recognition circuits 48 may be required for every 2016 matrix ports of switch 12. Tone recognition circuit 48 interfaces with the broadcast data channel and detects data representative of keypad tones on each DS0 channel that comprises the broadcast data channel, up to the maximum of 2016 DS0 data channels.

Tone recognition circuit 48 has an array of digital signal processor devices (not explicitly shown) that can be configured to provide tone detection and generation. Tone recognition circuit 48 may be a separate circuit card with plug-in connectors in order to be easily used in a rack containing fiber optic connection unit 14. Alternatively, tone recognition circuit 48 may include multiple circuit cards, or individual components on a single circuit card.

High speed line trunk processor circuit 50 is the primary shelf controller for all of the circuit cards in fiber optic connection unit 14 and provides the interface between fiber optic connection unit 14 and switch 12. High speed line trunk processor circuit 50 contains a microprocessor, a communications interface to all circuit cards of fiber optic connection unit 14, and a communications interface to line trunk manager circuit 26.

High speed line trunk processor circuit 50 may be embodied as a separate circuit card with plug-in connectors in order to be easily used in a rack containing fiber optic connection unit 14. Alternatively, high speed line trunk processor circuit 50 may be multiple circuit cards, or individual components on a single circuit card.

Ingress buses 60 are data buses that are operable to carry a data channel with a predetermined bit structure and at a predetermined frequency from an application card to bus control circuit 44. For example, each ingress bus 60 may comprise a single data channel with 8 parallel bits operating at a frequency of 25.92 MHZ. Other bit structures and frequencies may be used where suitable.

Egress buses 62 are data buses that are operable to carry a data channel with a predetermined bit structure and at a predetermined frequency to an application card from bus control circuit 44. For example, each egress bus 62 may comprise a single data channel with 16 parallel bits operating at a frequency of 51.84 MHZ. Other bit structures and frequencies may be used where suitable.

Common controller 16 is coupled to switch 12 and fiber optic connection unit 14. Common controller 16 is a processor that receives administration, control, and routing data from switch 12 and fiber optic connection unit 14, and generates administration, control and routing data that coordinates the operation of switch 12 and fiber optic connection unit 14. Common controller 16 may alternatively be incorporated within switch 12 or fiber optic connection unit 14.

In operation, telecommunications data from the network is transmitted via optical fiber 18 and received by fiber optic connection unit 14. This telecommunications data is then converted into electrical signals and transmitted through optical interface circuit 40 to application circuit 42 for broadcast switching through bus control circuit 44. The broadcast data is then switched back to application circuit 42 for retransmission through optical fiber 18 via optical interface circuit 40. The broadcast data may also or alternatively be transmitted to matrix interface circuit 46, tone recognition circuit 48, high speed line trunk processor circuit 50, or other suitable circuits to perform specific functions thereon.

Application circuits 42 are operable to receive the broadcast data and to selectively retransmit all or a portion of the data through optical interface circuit 40 to optical fiber 18. In this manner, switching of telecommunications data received from optical fiber 18 may be accomplished by bus control circuit 44 without the need for transmitting the data to switch 12 for switching.

Figure 2:
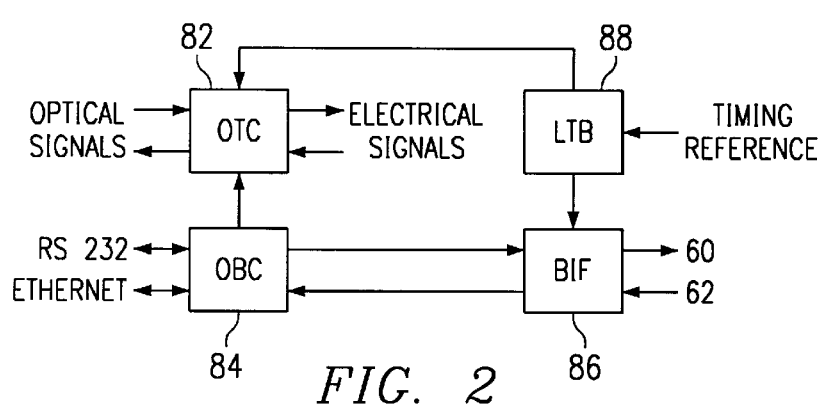
FIG. 2 is a block diagram of an optical interface system embodying concepts of the present invention.

FIG. 2 is a block diagram of optical interface system 40 embodying concepts of the present invention. Optical interface system 40 includes an optical terminator and signal processor circuit (OTC) 82. Optical terminator and signal processor circuit 82 includes circuitry for converting optical signals received from the network into electrical signals, and circuitry for converting electrical signals into optical signals. Optical terminator and signal processor circuit 82 also includes circuitry for converting the electrical signals into a predetermined data format and for removing relevant predetermined data from the predetermined data format. Optical terminator and signal processor circuit 82 is coupled to onboard control circuit (OBC) 84 and local time base circuit (LTB) 88.

Onboard control circuit 84 includes a microprocessor and associated circuitry that is used to implement control functions for optical interface system 40. Onboard control circuit 84 may include a microprocessor such as a Motorola MPC860, or other suitable microprocessors. Onboard control circuit 84 is operable to monitor components of optical interface system 40, to receive control commands and control data from bus interface circuit (BIF) 86, to transfer response data to bus interface circuit 86, and to automatically reset itself under predetermined conditions.

Bus interface circuit 86 is coupled to ingress bus 60, egress bus 62, local time base circuit 88, and onboard control circuit 84. Bus interface circuit 86 is operable to interface onboard control circuit 84 to ingress bus 60, egress bus 62, and local time base circuit 88. Bus interface circuit 86 provides routing for asynchronous transfer mode data on ingress bus 60 and egress bus 62.

Local time base circuit 88 is coupled to bus interface circuit 86 and optical terminator and signal processor circuit 82. Local time base circuit 88 receives an external timing reference signal from the network or other sources and generates local time signals for use by bus interface circuit 86, onboard control circuit 84, and optical terminator and signal processor circuit 82.

In operation, optical signals carrying encoded data are received from optical fiber 18 at optical terminator and signal processor circuit 82. These optical signals are converted into electrical signals carrying the encoded data, which are then transmitted to application circuits 42, bus control circuit 44, or other circuits. Control commands and control data used for converting the optical signal to an electrical signal are transmitted to onboard control circuit 84 from ingress bus 60 via bus interface circuit 86 or from RS 232 or Ethernet connections (not explicitly shown). Alternately, control commands and control data may be generated internally within onboard control circuit 84.

Optical terminator and signal processor circuit 82, onboard control circuit 84 and bus interface circuit 86 operate as a system to process data received via an optical signal at optical terminator and signal processor circuit 82, and to transfer the data via an electrical signal to other circuits, such as application circuits 42, switch 12, or other suitable circuits or systems. The operation of optical terminator and signal processor circuit 82, onboard control circuit 84, and bus interface circuit 86, is coordinated by timing signals generated by local time base circuit 88.

Figure 3:
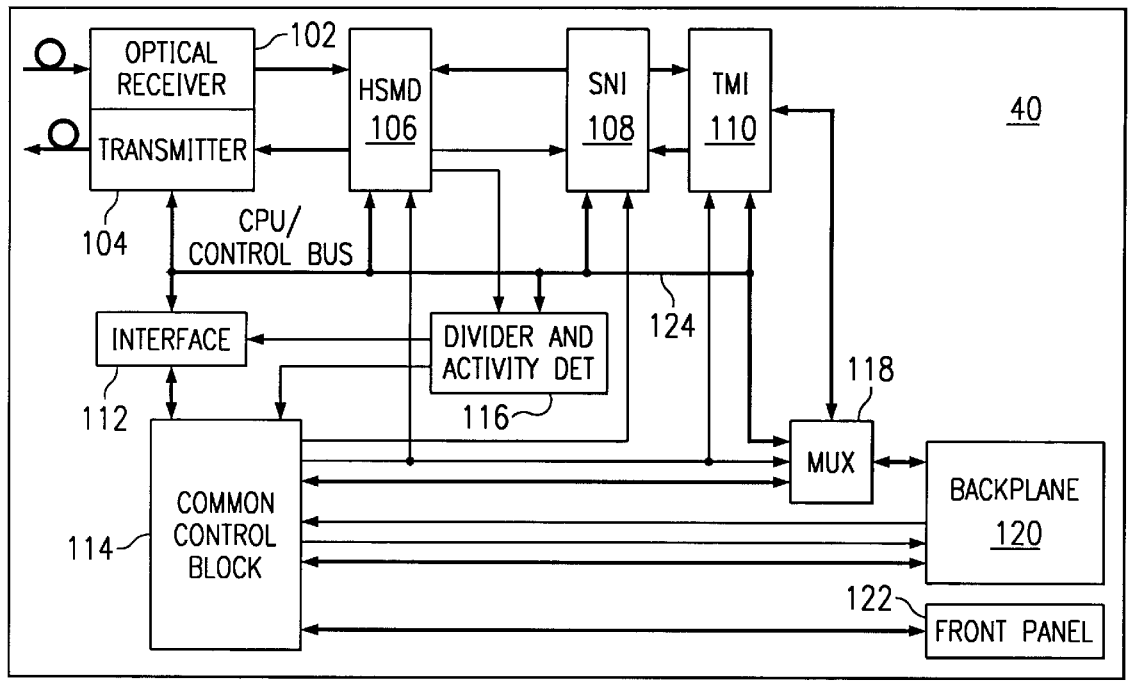
FIG. 3 is a block diagram of an optical interface circuit embodying concepts of the present invention.

FIG. 3 is a block diagram of optical interface circuit 40 embodying concepts of the present invention. Optical interface circuit 40 may be configured as a single circuit card for use in a data transmission system or in an optical fiber termination module for interfacing with the telecommunications switch, with plug-in connectors that allow the card to be easily installed and removed.

Optical interface circuit 40 includes optical receiver circuit 102 and optical transmitter circuit 104. Optical receiver circuit 102 and optical transmitter circuit 104 are coupled to optical fiber 18, high speed multiplex-demultiplex circuit (HSMD) 106, and interface circuit 112. Optical receiver circuit 102 and optical transmitter circuit 104 may include a single component, such as an integrated circuit package, or a plurality of components. Optical receiver circuit 102 includes optical receiver circuitry and clock recovery circuitry. Optical transmitter circuit 104 includes laser driver circuitry and monitoring circuitry.

Optical receiver circuit 102 is operable to receive an optical signal carrying encoded data and to generate an electrical signal carrying the same encoded data. The encoded data may comprise one or more channels of data, each channel having a suitable data format. Optical transmitter circuit 104 is operable to receive an electrical signal carrying encoded data and to generate an optical signal carrying the same encoded data. The encoded data may comprise one or more channels of data, each channel having a suitable data format.

High speed multiplex-demultiplex circuit 106 is a telecommunications data processing device that is operable to receive a high speed serial data channel from optical receiver circuit 102, to convert the high speed serial data channel to a parallel data channel at a lower frequency, and to transmit the parallel data channel to synchronous network interface circuit (SNI) 108. High speed multiplex-demultiplex circuit 106 is coupled to optical receiver circuit 102, optical transmitter circuit 104, and to synchronous network interface circuit 108.

High speed multiplex-demultiplex 106 is also operable to receive a parallel data channel from synchronous network interface circuit 108, to convert the parallel channel to a high speed serial data channel, and to transmit the high speed serial data channel to optical transmitter circuit 104. High speed multiplex-demultiplex circuit 106 couples to CPU control bus 124, synchronous network interface circuit 108, to triple matrix interface circuit (TMI) 110, and to multiplexer (MUX) 118.

High speed multiplex-demultiplex circuit 106 may receive a data channel comprising data in a differential STS-3 data format and clock signals from optical receiver circuit 102, and may demultiplex the bit-serial differential STS-3 data format into a byte-wide STS-3 data format. High speed multiplex-demultiplex circuit 106 detects and recovers an STS-3 data frame from the bit-serial data channel and provides a byte-wide STS-3 data channel and clock data to synchronous network interface circuit 108.

High speed multiplex-demultiplex circuit 106 is also operable to multiplex a byte-wide data channel carrying data in an STS-3 data format into a bit-serial data channel carrying data in an STS-3 data format, and to transmit the bit-serial STS-3 data to synchronous network interface circuit 108. High speed multiplex-demultiplex circuit 106 phase locks to the reference clock signal received from the local time base circuit 88.

Synchronous network interface circuit 108 receives a byte-serial STS-3 data channel from the high speed multiplex-demultiplex circuit 106. Synchronous network interface circuit 108 verifies that the data channel is in an STS-3 data frame format, checks for the section bit-interleaved-parity-8 bit code that is encoded into the STS-3 data frame, and may optionally descramble the STS-3 byte-serial data channel. In addition, section and line overhead bytes, which are administration and control data that are encoded into predetermined locations in the STS-3 data format, are terminated by synchronous network interface circuit 108 at this time. Synchronous network interface circuit 108 also monitors the value of the bit-interleaved-parity-8 data and the status of the inbound line, section alarm data, and system performance.

Path overhead bytes, which are also administration and control data that are encoded into predetermined locations in the STS-3 data format, may be retrieved by system network interface circuit 108 and transmitted to common control circuit 114 for monitoring. Pointer processing is then accomplished on the STS-3 data channels according to provisioning data received from ingress bus 60. After pointer processing, the STS-3 data channels are converted into an STS-3P proprietary data frame format data channel.

The STS-3P frame is identical to an STS-3 frame except that transport overhead byte C1#1 is replaced by a byte with a proprietary definition to convey predetermined data downstream of the synchronous network interface circuit 108, such as synchronous transport signal alarm indication data, path alarm indication data, and STS-3P synchronous payload envelope data. The STS-3P data format comprises three STS-1 data formats. Once converted, the STS-3P is output in a byte-serial data channel to triple matrix interface circuit 110.

Synchronous network interface circuit 108 is also operable to receive a byte-serial STS-3P data channel from triple matrix interface circuit 110. Synchronous network interface circuit 108 detects and processes STS-1P signals based on information contained in the STS-3P data channel. The STS-3P data frame is then byte interleaved into three eight bit parallel data channels, and transport overhead is inserted into the data channels. Transport overhead may be provided from registers within synchronous network interface circuit 108 previously configured by common control circuit 114. All undefined overhead bytes in the data frame are replaced with zeros.

Overhead data comprising framing data, section bit-interleaved-parity-8 data, and line bit-interleaved-parity-8 data are internally generated by the synchronous network interface circuit 108. After all overhead data is inserted, the three STS-1 data channels are multiplexed into a single STS-3 byte-serial data channel by synchronous network interface circuit 108. The single STS-3 byte-serial data channel may be optionally scrambled and output to high speed multiplex-demultiplex circuit 106 after the STS-3 frame is retimed to system timing.

Synchronous network interface circuit 108 is coupled to high speed multiplex-demultiplex circuit 106, triple matrix interface circuit 110, and CPU control bus 124. Synchronous network interface circuit 108 is also coupled to interface circuit 112, divider and activity detector circuit 116, and multiplexer 118 through CPU control bus 124. Synchronous network interface circuit 108 monitors the STS-3 data channel for loss of frame data and loss of signal data, originates K1 and K2 overhead data, and generates far end receive failure data.

Triple matrix interface circuit 110 is a data communications circuit that receives a byte-serial STS-3P data channel from synchronous network interface circuit 108. Triple matrix interface circuit 110 demultiplexes the single STS-3P data channel into three byte-serial STS-1P data channels. The three byte-serial STS-1P data channels are retimed to an internal system clock frequency, such as 6.48 megahertz. Triple matrix interface circuit 110 then separates network transport overhead data from the STS-LP data channels and discards the overhead data. Proprietary overhead data is then encoded into the STS-1P data channels and the byte-serial data is converted to bit-serial data. The three bit-serial STS-1P data channels are then output to application circuits 42.

Triple matrix interface circuit 110 is also operable to receive three STS-1P bit-serial data channels from application circuits 42. These data channels may be duplicated into two redundant planes. The bit-serial data channels are converted to byte-serial data channels. All STS-1P data channels are then phase aligned, descrambled, and checked for valid error correction bit-interleaved-parity data and broadband coding identification data. The error correction bit-interleaved-parity data and broadband coding identification data is then stored in registers for performance monitoring.

Triple matrix interface circuit 110 is provisioned by common control circuit 114 to select one of the STS-1P redundant data channels as the "active" channel based upon performance data. This selection is made for each of the three pairs or redundant STS-1P data channels. Each of the active STS-1P data channels are reformatted according to control commands and control data, such as provisioning data and new pointer values. The three byte-serial STS-1P data channels are then multiplexed into a single byte-serial STS-3P data channel, which is output to synchronous network interface circuit 108.

Interface circuit 112 is a programmable interface circuit that interfaces common control circuit 114 with components of optical interface circuit 40. Interface circuit 112 couples to CPU control bus 124, divider and activity detector circuit 116, and common control circuit 114. Interface circuit 112 may be a field programmable gate array, or other suitable programmable interface circuits.

Multiplexer 118 is multiplexer circuit that is operable to receive test patterns from common control circuit 114. Multiplexer 118 is coupled to common control circuit 114, triple matrix interface circuit 110, and CPU control bus 124. Multiplexer 118 is operable to receive one of four or more STS-1P data frames generated by common control circuit 114, and to transmit the data to common control block 114, which can monitor up to two STS-1P data channels. Each monitored data channel comprises STS-1P frame data, descrambler data, and error detection data. For example, error detection data may include out-of-frame data, error correction bit-interleaved-parity-8 data, and channel identification data.

Common control circuit 114 performs administration, maintenance, and control functions. Common control circuit 114 may include, for example, a Motorola MPC860 communications controller, a flash memory circuit, a dynamic random access memory circuit, an erasable-programmable read-only memory circuit, and a static random access memory circuit. Common control circuit 114 may be similar to onboard control circuit 84.

In operation, an optical signal carrying one or more channels of data is received at optical receiver circuit 102, which generates an electrical signal carrying the same data. High speed multiplex-demultiplex circuit 106 receives the electrical signal from optical receiver circuit 102 and performs predetermined data processing operations on a predetermined data channel. High speed multiplex-demultiplex circuit 106 then converts the predetermined data channel into a byte-serial data channel at a lower frequency, and transmits the data channel to synchronous network interface circuit 108.

Synchronous network interface circuit 108 performs additional predetermined data processing on the data channel and transmits the data channel to triple matrix interface circuit 110. Triple matrix interface circuit 110 separates the data channel into three separate redundant data channels and transmits the three separate redundant data channels to application cards 42 or other predetermined locations.

Common control circuit 114 is operable to monitor error signals generated by optical receiver circuit 102 and optical transmitter circuit 104, high speed multiplex-demultiplex circuit 106, synchronous network interface circuit 108, and triple matrix interface circuit 110. Common control circuit 114 also generates test patterns which are transmitted to the components of optical interface circuit 40 through multiplexer 118. These test patterns cause the components of optical interface circuit 40 to generate data that may be used to verify that the components are operating properly.

Figure 4:
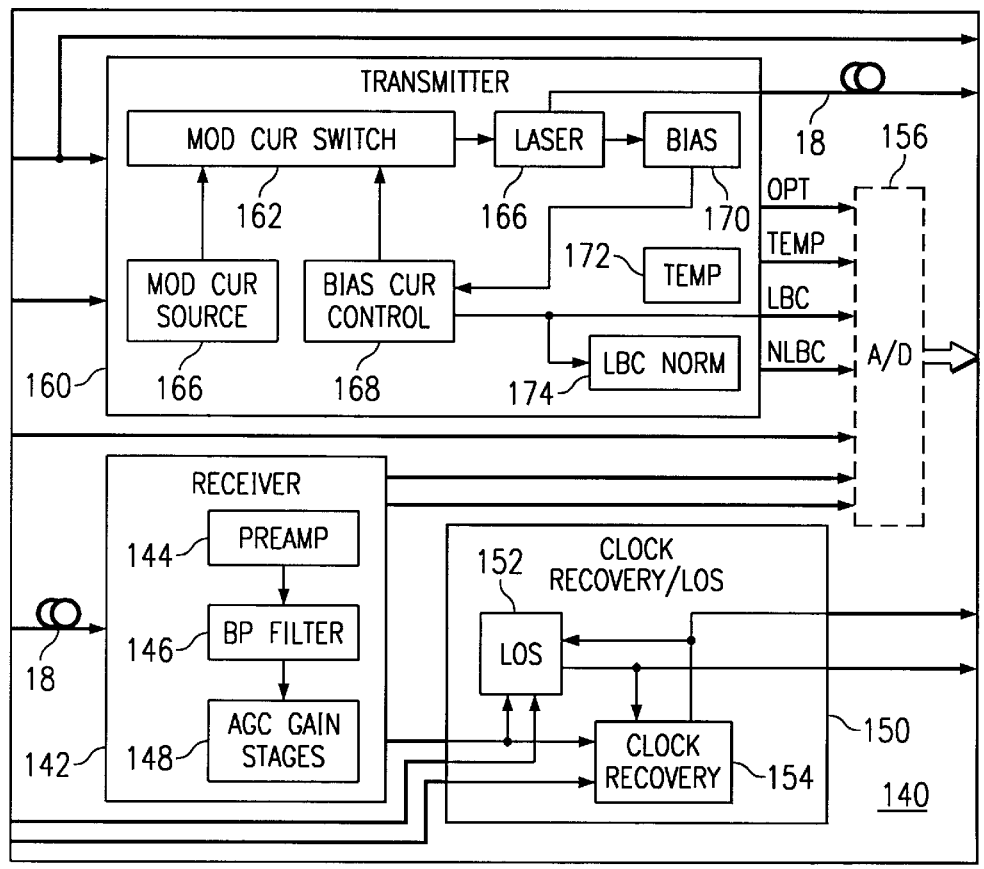
FIG. 4 is a block diagram of an optical receiver driver circuit embodying concepts of the present invention.

FIG. 4 is a block diagram of optical receiver-driver circuit 140 embodying concepts of the present invention. Optical receiver-driver circuit 140 may be used to implement optical receiver circuit 102 and optical transmitter circuit 104 of optical interface circuit 40 of FIG. 3.

Optical receiver-driver circuit 140 includes optical receiver circuit 142. Optical receiver circuit 142 couples to optical fiber 18 and pre-amplifier circuit 144, and-is operable to receive optical signals having encoded data and to generate electrical signals carrying the same encoded data. Pre-amplifier circuit 144 is coupled to band-pass filter circuit 146 which filters the electrical data to block low and high frequency noise. Band-pass filter circuit 146 then transmits the signal to automatic gain controlling gain stage circuits 148, which amplify the signal to within an appropriate calibrated level.

Clock recovery and loss-of-signal circuit 150 is coupled to optical receiver circuit 142. Clock recovery and loss-of-signal circuit 150 receives the signal from optical receiver circuit 142 and determines if a loss of signal has occurred with loss of signal detection circuitry (LOS) 152. If a loss of signal has occurred, a loss-of-signal indicator is transmitted to common control circuit 114 of optical interface circuit 40 in FIG. 3. Clock recovery circuit 154 couples to local time base circuit 88 and receives a clock signal from local time base circuit 88 that is used to recover local timing when a loss of signal has occurred.

Analog to digital convertor circuit 156 is an eight channel analog to digital converter that receives data from optical receiver circuit 142 and transmitter circuit 160. The analog inputs to analog to digital converter circuit include laser bias circuit (BIAS) 170 and temperature detection circuit 172. Analog to digital converter circuit 156 multiplexes the analog data signals and converts the analog data into a digital data signal. The digital data signal is then transmitted to common control circuit 114.

Transmitter circuit 160 is operable to receive an electrical signal carrying encoded data from high speed multiplex-demultiplex circuit 106. This electrical signal modulates a current switch circuit 162, which in turn controls laser circuit 164. Laser circuit 164 encodes the data received through modulation by current switch circuit 162 into an optical signal that is transmitted by transmitter circuit 160 to optical fiber 18. Modulation current source circuit 166 and bias current controller circuit 168 are used to provide input to modulate current switch circuit 162.

Figure 5:
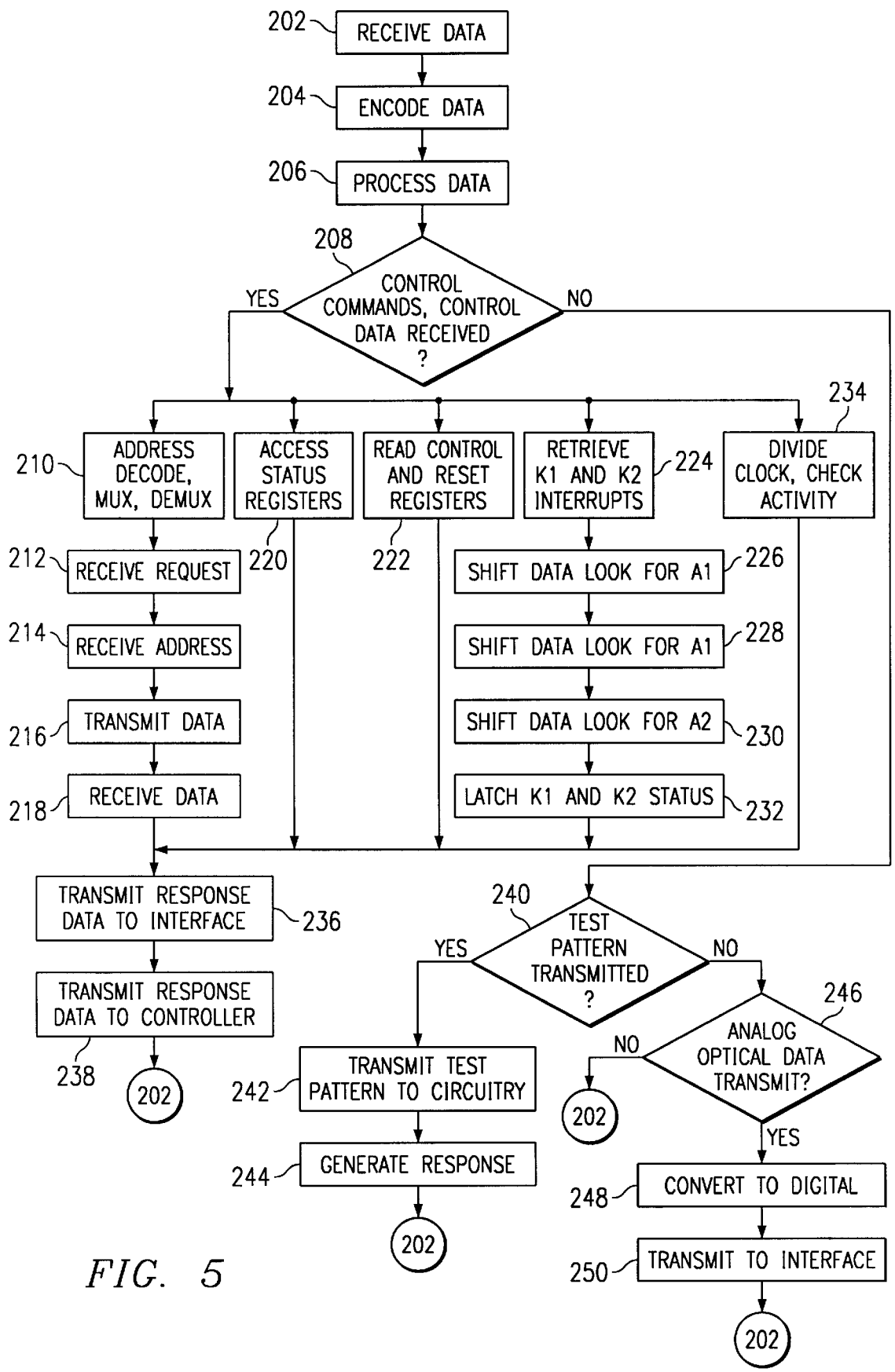
FIG. 5 is a flow chart of a method for interfacing an optical fiber to an electrical circuit in accordance with teachings of the present invention.

FIG. 5 is a flow chart of a method 200 for interfacing an optical fiber to an electrical circuit in accordance with teachings of the present invention. Method 200 begins at step 202, where encoded data is received from an optical signal at a receiver. At step 204, the data is encoded into an electrical signal. The electrical signal is processed at step 206 with signal processing circuitry to isolate predetermined data from the encoded data.

At step 208, it is determined whether control commands and control data have been received at an interface from a controller. For example, the control commands and control data may be used to define one of five logic functions. The first logic function, at step 210, is address decoding and multiplexing/demultiplexing of the address and data bus from common control circuit 114 to synchronous network interface circuit 108 and triple matrix interface circuit 110. The first logic function is accomplished by a state machine with four consecutive states. These four states are (1) receive processor access request to components at step 212; (2) receive component address at step 214; (3) transmit data to component if write cycle at step 216; or (4) receive data from component if read cycle at step 218 and return to state 1.

The second logic function, at step 220, is access to the status registers of analog to digital converter circuit 156. The third logic function, at step 222, is reading of control and reset registers contained within interface 112.

The fourth logic function, at step 224, is to retrieve the K1 and K2 interrupts from the serial header data produced by synchronous network interface circuit 108. The fourth logic function is accomplished by a state machine with four consecutive states. These four states are (1) shift in northbound data and look for A1 pattern at step 226; (2) shift eight times and look for A1 pattern again at step 228; (3) shift eight times and look for A2 pattern at step 230; and (4) latch the K1 and K2 status in the interrupt register at step 232.

The fifth logic function at step 234 is to divide the 51.84 MHZ derived network clock by eight to yield the 6.48 MHZ reference clock, and to check for clock activity. An interrupt is generated if clock activity is not detected.

At step 236, the response data to the control commands and the control data is transmitted from the signal processing circuitry to the interface. At step 238, any response data at the interface is transmitted to the controller. The method then returns to step 202.

If control commands and control data have not been received at the interface at step 208, it is determined whether a test pattern has been transmitted to the multiplexer from the controller at step 240. If the test pattern has been transmitted to the multiplexer, the test pattern is next transmitted from the multiplexer to the signal processing circuitry at step 242. Response data is then generated at the signal processing circuitry in response to the test pattern at step 244. The method then returns to step 202, where the response data may be transmitted from the signal processing circuitry to common control circuit 114 in accordance with steps 202 through 238.

If a test pattern has not been transmitted to the multiplexer from the controller at step 240, it is determined at step 246 whether analog optical device data is to be transmitted to an analog to digital converter. If analog optical device data is to be transmitted, the method proceeds to step 248 where the analog optical device data is converted to a digital signal.

If there are two or more analog optical device data signals, the signals may be multiplexed into a single analog optical device signal, and converted to a digital signal. At step 250, the digital signal is transmitted to the interface, and the method returns to step 202. If there is no analog optical device data to be transmitted at step 246, the method returns to step 202.

In operation, an optical signal carrying encoded data is received at an optical interface. The optical interface generates an electrical signal carrying the encoded data, performs monitoring of the encoded data, and converts the format of the encoded data into other predetermined formats. A controller of the optical interface is operable to transmit test patterns to other components of the optical interface, to verify that the components are operating properly. The controller is also operable to monitor analog parameters of an optical receiver and optical transmitter of the optical interface.

The present invention provides many important technical advantages. One important technical advantage of the present invention is an optical fiber interface that is operable to simultaneously transfer data channels between an optical signal and an electrical signal while extracting data from the data channels. Another important technical advantage of the present invention is an optical fiber interface that is operable to simultaneously transfer data channels between an optical signal and an electrical signal while inserting data into the data channels.

Although several embodiments of the present invention and its advantages have been described in detail, it should be understood that mutations, changes, substitutions, transformations, modifications, variations, and alterations can be made therein without departing from the teachings of the present invention, the spirit and scope of the invention being set forth by the appended claims.

What is claimed is:

1. An optical interface circuit comprising:
   a receiver circuit operable to receive incoming data from an optical signal and to generate an electrical signal that is encoded with the incoming data;
   a transmitter circuit operable to receive outgoing data from an electrical signal and to generate an optical signal that is encoded with the outgoing data;
   an interface circuit coupled to the receiver circuit and the transmitter circuit, the interface circuit operable to transmit control commands and control data to the receiver circuit and the transmitter circuit and to receive response data from the receiver circuit and the transmitter circuit; and
   a controller circuit coupled to the interface circuit, the controller circuit operable to transmit the control commands and the control data to the interface circuit and to receive the response data from the interface circuit.

2. The optical interface circuit of claim 1 wherein the optical signal is in an OC-3 data format.

3. The optical interface circuit of claim 1 wherein the electrical signal is in an STS-3 data format.

4. The optical interface circuit of claim 1 further comprising a high speed multiplexer and demultiplexer circuit coupled to the receiver circuit and the transmitter circuit, the high speed multiplexer and demultiplexer operable to convert the incoming data into a first data format, the high speed multiplexer and demultiplexer circuit further operable to convert data from the first data format into outgoing data.

5. The optical interface circuit of claim 1 further comprising a synchronous network interface circuit coupled to the receiver circuit and the transmitter circuit, the synchronous network interface circuit operable to extract predetermined data from the incoming data, the synchronous network interface circuit further operable to encode predetermined data into the outgoing data.

6. The optical interface circuit of claim 1 further comprising a triple matrix interface circuit coupled to the receiver circuit and the transmitter circuit, the triple matrix interface circuit operable to convert the incoming data from a first data format into a second data format, and to convert the outgoing data from the second data format into the first data format.

7. The optical interface circuit of claim 1 wherein the first data format is a proprietary STS-3 data format.

8. The optical interface circuit of claim 1 wherein the second data format is a proprietary STS-1 data format.

9. The optical interface circuit of claim 1 wherein the optical interface circuit is configured as a single circuit card for use in a data transmission system, with plug-in connectors that allow the card to be easily installed and removed.

10. The optical interface circuit of claim 1 wherein the optical interface circuit is configured as a single circuit card for use in an optical fiber termination module for interfacing with a telecommunications switch, with plug-in connectors that allow the card to be easily installed and removed.

11. The optical interface circuit of claim 1 further comprising an analog to digital converter circuit coupled to the receiver circuit, the transmitter circuit, and the controller circuit, the analog to digital converter circuit operable to multiplex analog input signals from the receiver circuit and the transmitter circuit, to convert the multiplexed signal to a digital data signal, and to transmit the digital data signal to the controller circuit.

12. The optical interface circuit of claim 1 further comprising:

a high speed multiplexer and demultiplexer circuit coupled to the receiver circuit, the transmitter circuit, and the interface circuit, the high speed multiplexer and demultiplexer operable to convert the incoming data into a first data format, the high speed multiplexer and demultiplexer circuit further operable to convert data from the first data format into outgoing data;

a synchronous network interface circuit coupled to the high speed multiplexer and demultiplexer circuit and the interface circuit, the synchronous network interface circuit operable to receive the incoming data from the high speed multiplexer and demultiplexer circuit and to extract predetermined data from the incoming data, the synchronous network interface circuit further operable to encode predetermined data into the outgoing data and to transmit the outgoing data to the high speed multiplexer and demultiplexer circuit;

a triple matrix interface circuit coupled to the synchronous network interface circuit and the interface circuit, the triple matrix interface circuit operable to receive the incoming data from the synchronous network interface circuit and to convert the first data format into a second data format, and to convert the outgoing data from the second data format into the first data format;

the controller circuit operable to generate a test data signal and to transmit the test data signal to the triple matrix interface circuit, the synchronous network interface circuit, and the high speed multiplexer and demultiplexer circuit; and the interface circuit operable to receive test response signals from the triple matrix interface circuit, the synchronous network interface circuit, and the high speed multiplexer and demultiplexer circuit and to transmit the test response signals to the controller circuit.

13. A method for interfacing an optical fiber to an electrical circuit comprising:

receiving encoded data from an optical signal at a receiver;

generating an electrical signal with the encoded data;

processing the electrical signal with signal processing circuitry to isolate predetermined data from the encoded data;

receiving control commands and control data at an interface from a controller;

transmitting the control commands and the control data to the signal processing circuitry from the interface;

receiving response data from the signal processing circuitry at the interface; and transmitting the response data to the controller from the interface.

14. The method of claim 13 further comprising:

transmitting a test pattern to a multiplexer from the controller;

transmitting the test pattern from the multiplexer to the signal processing circuitry; and generating response data at the signal processing circuitry in response to the test pattern.

15. The method of claim 13 further comprising:

transmitting analog optical device data to an analog to digital converter;

converting the analog optical device data to a digital signal; and transmitting the digital signal to the interface.

16. The method of claim 13 further comprising:

transmitting two or more analog optical device data signals to an analog to digital converter;

multiplexing the two or more analog optical device data signals into a single analog optical device signal;

converting the single analog optical device data signal to a digital signal; and transmitting the digital signal to the interface.

17. The method of claim 13 further comprising:

receiving the control commands and control data at the controller from an egress bus; and transmitting the response data from the controller over an ingress bus.

18. The method of claim 13 further comprising:

receiving a processor access request to components at an interface;

receive a component address at an interface;

transmitting data to the component from the interface during a write cycle; and receiving data from the component during a read cycle.

19. The method of claim 13 further comprising accessing the status registers of an analog to digital converter circuit.

20. The method of claim 13 further comprising reading control and reset registers contained within an interface and a multiplexer.

21. The method of claim 13 further comprising:

shifting data into an interface until an A1 pattern is detected;

shifting data into the interface until a second A1 pattern is detected;

shifting data into the interface until an A2 pattern is detected; and latching K1 data and K2 data into an interrupt register of the interface.

22. The method of claim 13 further comprising:

dividing a network clock frequency by a predetermined integer to generate a reference clock frequency; and generating an interrupt is no network clock activity is detected.

23. A system for interfacing an optical fiber to an electrical circuit comprising:

a fiber optic terminator operable to receive optical signals from an optical fiber, to encode data from the optical signal into an electrical signal, to encode data from the electrical signal into the optical signal, and to transmit optical signals over the optical fiber;

a controller coupled to the fiber optic terminator, the controller operable to transmit control data to the fiber optic terminator; and a bus interface coupled to an ingress bus, an egress bus, and the controller, the bus interface operable to receive data from the egress bus, transmit data to the controller, receive data from the controller, and to transmit data over an ingress bus.

24. The system of claim 23 further comprising a local time base coupled to the bus interface and the fiber optic terminator, the local time base operable to receive a timing reference signal and to transmit the timing reference signal to the bus interface and the fiber optic terminator.

25. The system of claim 23 wherein the fiber optic terminator, the controller, and the bus interface are configured as a single circuit card for use in a data transmission system, with plug-in connectors that allow the card to be easily installed and removed.

26. The system of claim 23 wherein the fiber optic terminator, the controller, and the bus interface are configured as a single circuit card for use in an optical fiber termination module for interfacing with a telecommunications switch, with plug-in connectors that allow the card to be easily installed and removed.

* * * * *